(12) United States Patent
Zhong et al.

(10) Patent No.: US 8,240,699 B2
(45) Date of Patent: Aug. 14, 2012

(54) CASTER DEVICE AND INFANT SUPPORTING APPARATUS HAVING THE SAME

(75) Inventors: Zhi-Ren Zhong, Central (HK); Zheng-Wen Guo, Taipei (TW)

(73) Assignee: Wonderland Nurserygoods Company, Limited, Central (HK)

( * ) Notice: Subject to any disclaimer, the term of this patent is extended or adjusted under 35 U.S.C. 154(b) by 125 days.

(21) Appl. No.: 12/814,115

(22) Filed: Jun. 11, 2010

(65) Prior Publication Data

US 2011/0121545 A1   May 26, 2011

(30) Foreign Application Priority Data

Nov. 23, 2009 (CN) .......................... 2009 1 0225916

(51) Int. Cl.
*B62B 7/02* (2006.01)

(52) U.S. Cl. .......................... 280/647; 16/34

(58) Field of Classification Search .................. 280/646, 280/648, 7.17, 9, 43, 658, 38, 47.38, 43.24, 280/30, 31, 11, 7.12, 641, 87.01, 87.021, 280/87.051; 297/131, 130; 472/102; 16/32, 16/34, 28, 35 R See application file for complete search history.

(56) References Cited

U.S. PATENT DOCUMENTS

| | | | |
|---|---|---|---|
| 1,546,617 A * | 7/1925 | Caldwell et al. ................ 280/43 |
| 3,944,241 A * | 3/1976 | Epelbaum ...................... 280/30 |
| 5,636,853 A * | 6/1997 | Huang ............................ 280/30 |
| 5,720,079 A * | 2/1998 | Yang ............................. 16/35 R |
| 6,704,949 B2 * | 3/2004 | Waldman et al. ............... 5/93.1 |
| 6,728,980 B1 * | 5/2004 | Chen .............................. 5/93.1 |
| 6,934,981 B2 * | 8/2005 | Waldman et al. ................. 5/95 |
| 7,070,188 B2 * | 7/2006 | Waldman et al. ............. 280/31 |
| 2003/0137130 A1 * | 7/2003 | Chang ......................... 280/641 |
| 2004/0181873 A1 * | 9/2004 | Waldman et al. ................. 5/95 |
| 2005/0005353 A1 * | 1/2005 | Waldman et al. ................ 5/101 |
| 2005/0098969 A1 * | 5/2005 | Waldman et al. .......... 280/47.38 |
| 2011/0121545 A1 * | 5/2011 | Zhong et al. ................. 280/647 |

* cited by examiner

*Primary Examiner* — John Walters
*Assistant Examiner* — James Triggs
(74) *Attorney, Agent, or Firm* — Allston L. Jones; Peters Verny, LLP

(57) ABSTRACT

A caster includes a housing, a rotating member, and a caster. The housing defines an accommodation space having an open bottom end. The rotating member is disposed within the housing, and is rotatable between first and second angular positions. The caster is co-rotatable with the rotating member. One of the housing and the rotating member has first and second engaging portions. The other one of the housing and the rotating member has a third engaging portion, which engages the first engaging portion so that the caster is unfolded and disposed outwardly of the housing when the rotating member is at the first angular position and which engages the second engaging portion so that the caster is folded and disposed at a folded position and within the accommodation space when the rotating member is at the second angular position.

22 Claims, 15 Drawing Sheets

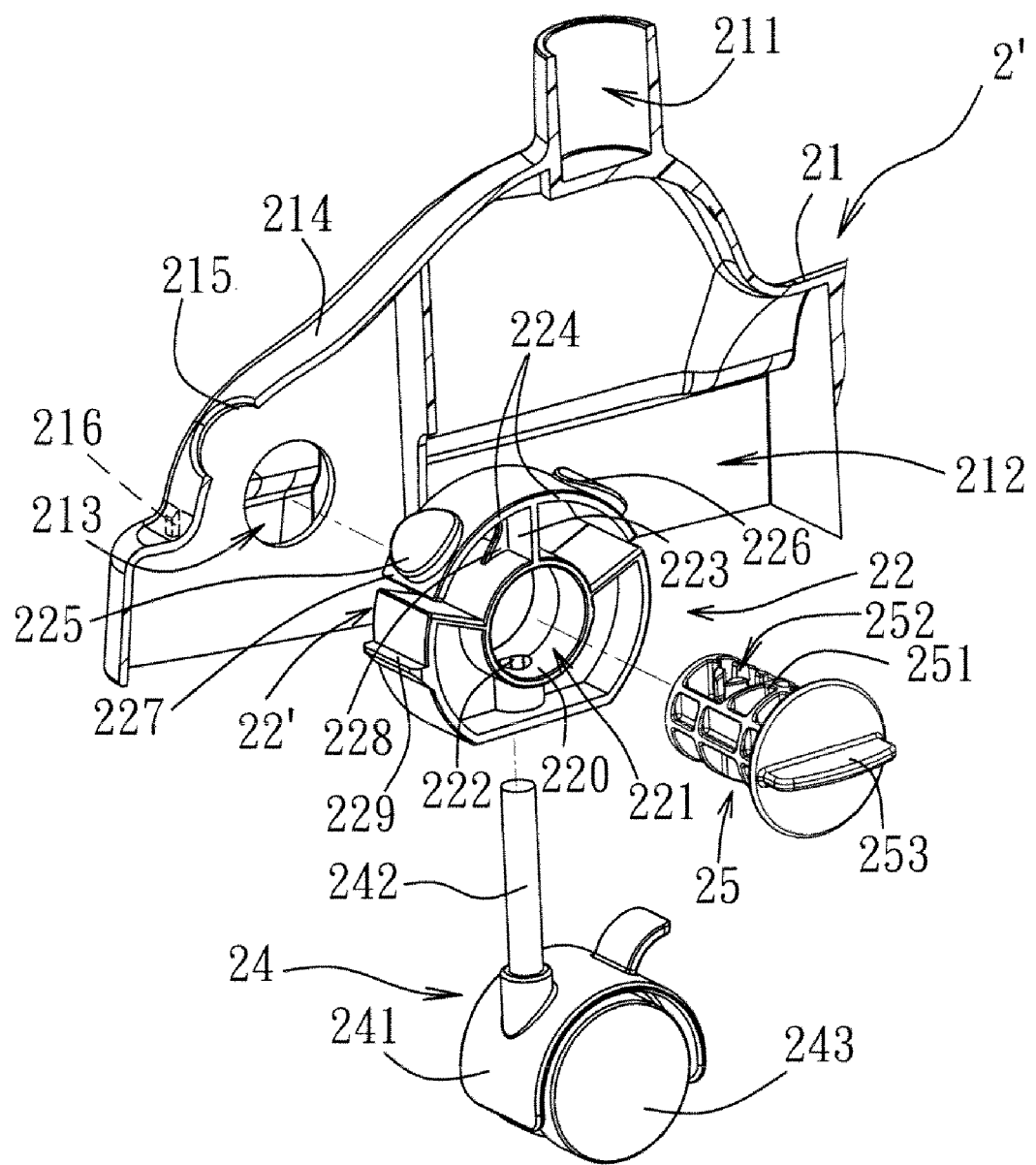
F I G. 5

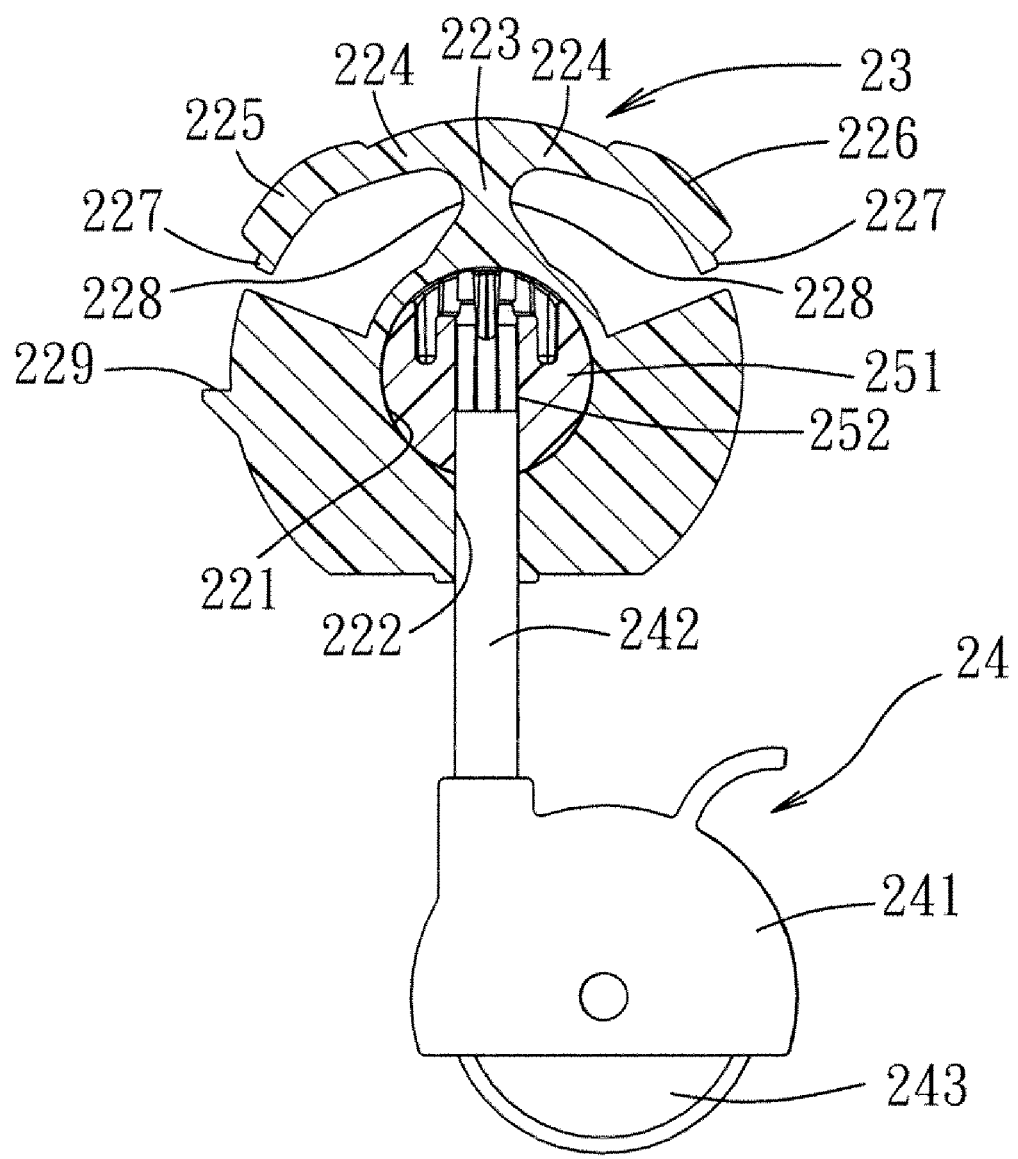
F I G. 6

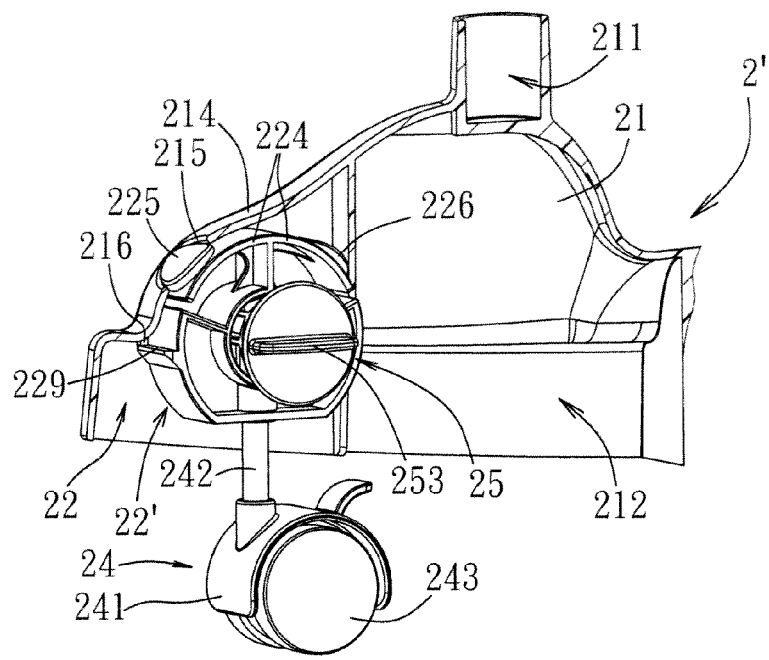
F I G. 7
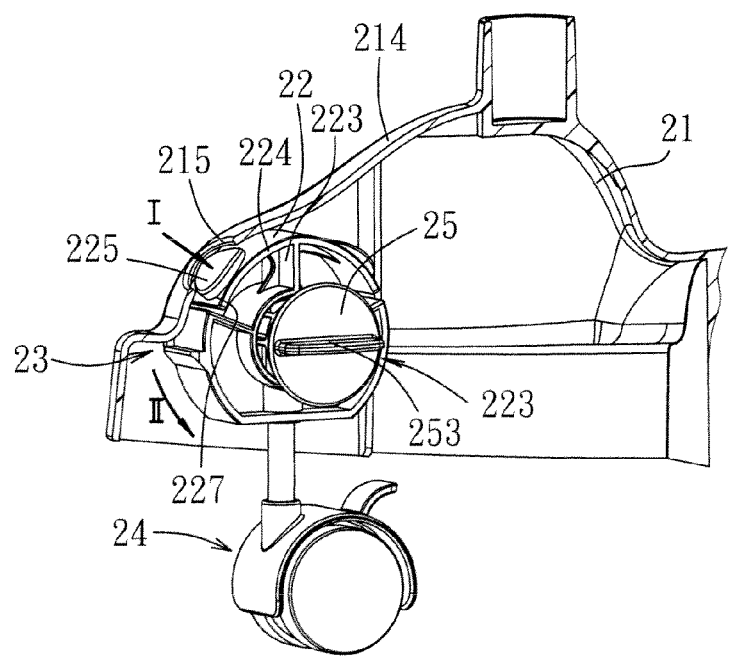
F I G. 8

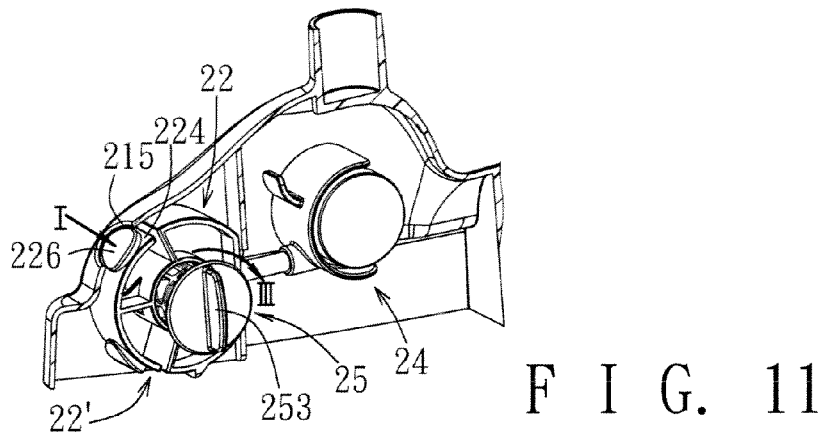
FIG. 11
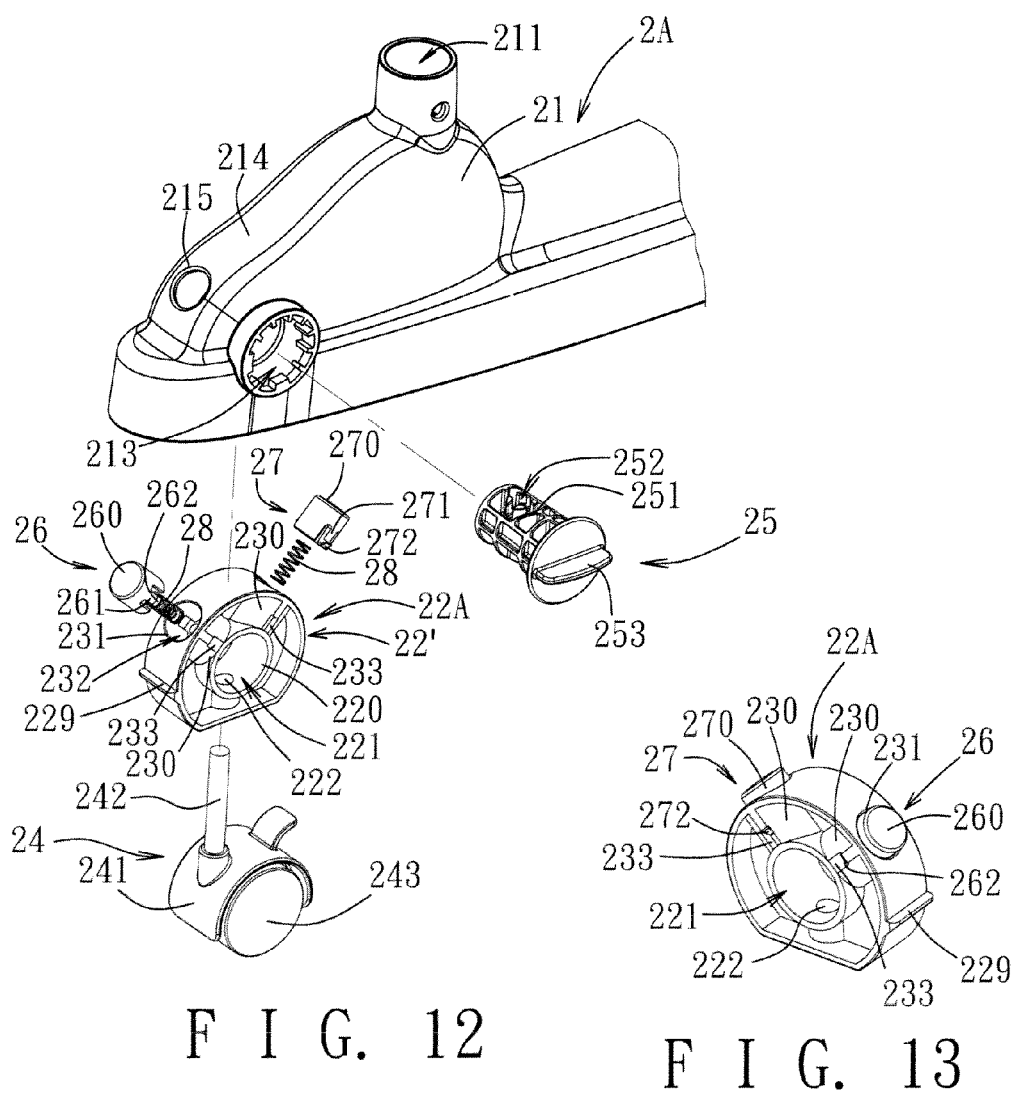
FIG. 12
FIG. 13

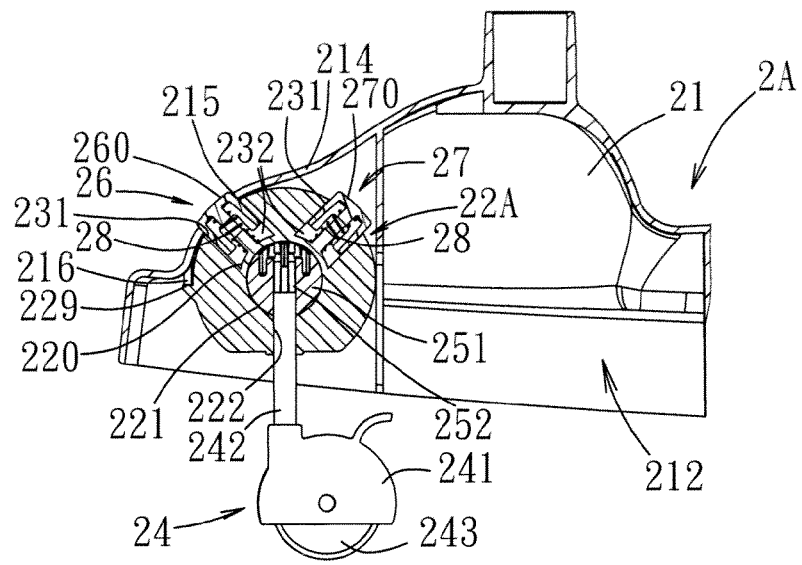
F I G. 14
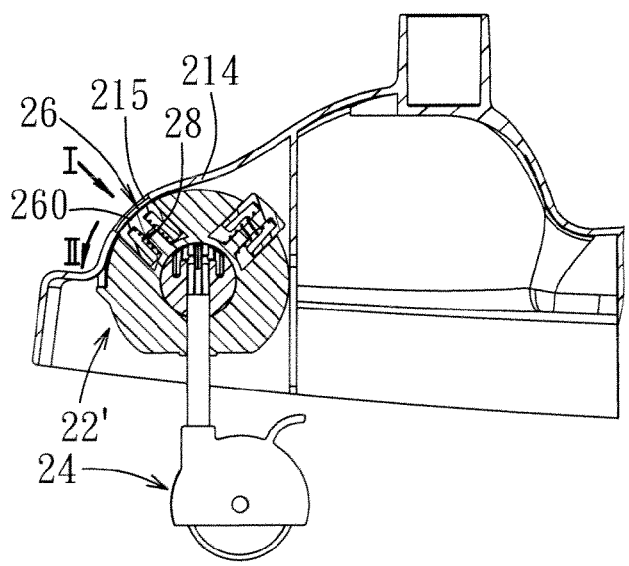
F I G. 15

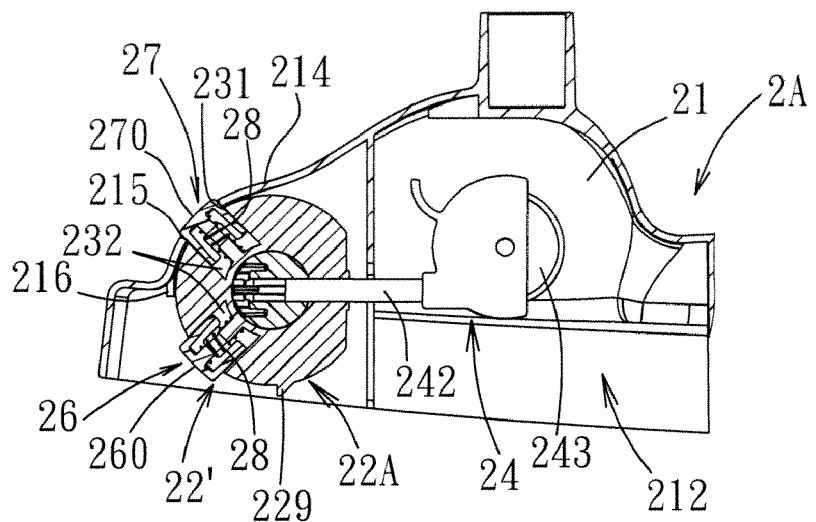
F I G. 16
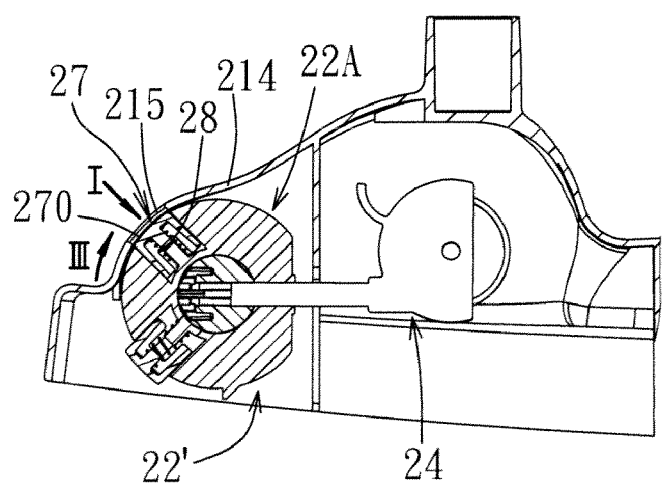
F I G. 17

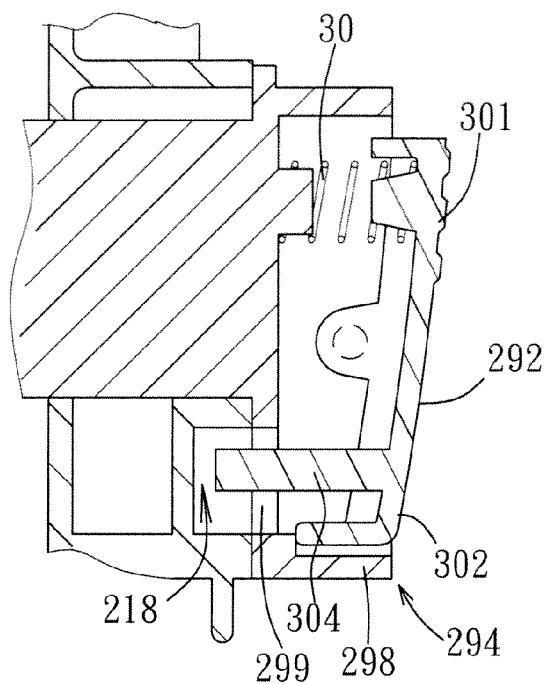
F I G. 23
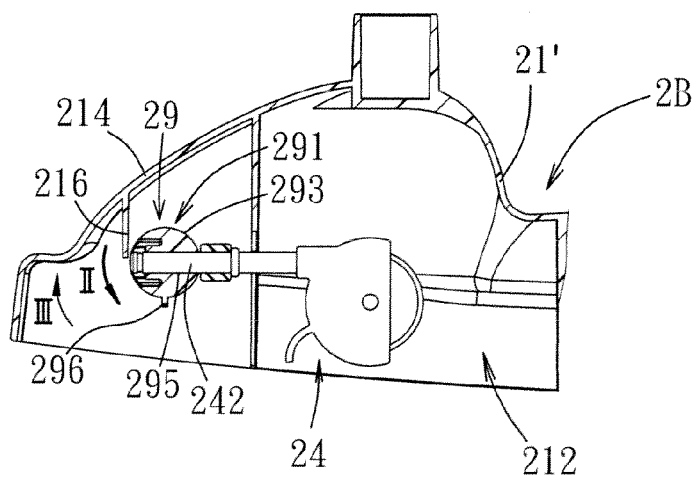
F I G. 24

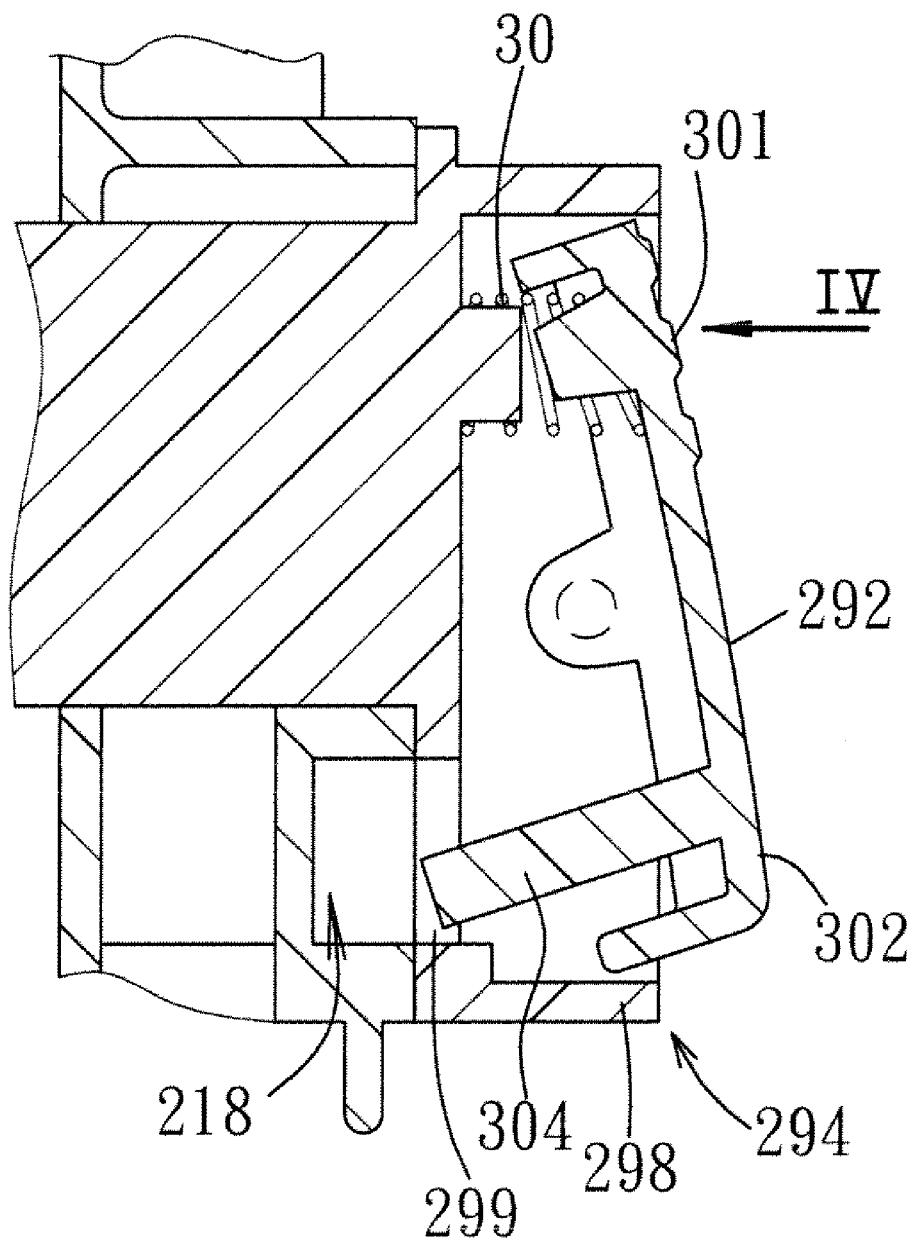
F I G. 25

CASTER DEVICE AND INFANT SUPPORTING APPARATUS HAVING THE SAME

CROSS-REFERENCE TO RELATED APPLICATION

This application claims priority of Chinese Application No. 200910225916.6, filed on Nov. 23, 2009.

BACKGROUND OF THE INVENTION

1. Field of the Invention

This invention relates to a caster device and an infant supporting apparatus having the same, and more particularly to a foldable caster device and an infant supporting apparatus having the same.

2. Description of the Related Art

An existing infant rocking bed is typically provided with foldable caster devices. When the caster devices are unfolded, the infant rocking bed could be moved on the ground. When the caster devices are folded, the infant rocking bed is swingable on the ground. Such a foldable caster device is disclosed in U.S. Pat. No. 7,070,188.

The foldable caster device disclosed in U.S. Pat. No. 7,070,188 includes a housing, a rotatable member disposed rotatably on the housing, a caster driven by the rotatable member to rotate, a locking member disposed movably on the housing, and a spring for biasing the locking member. The locking member is biased to engage a selected one of openings in the rotatable member for positioning the caster at an extended position or a retracted position. However, since the locking member projects from a top portion of the housing, the outer appearance of the caster device is affected adversely. That is, the caster device cannot have a neat appearance. Furthermore, such a locking structure renders the manufacture of the caster device more complex to thereby increase the manufacturing costs of the caster device.

SUMMARY OF THE INVENTION

An object of this invention is to provide a caster device that is simple in construction, that can reduce the manufacturing costs and the assembly time thereof, and that is convenient to operate.

Another object of this invention is to provide a caster device that includes a caster convertible between unfolded and folded positions.

Still another object of this invention is to provide an infant supporting apparatus having a caster device that is simple in construction, that can reduce the manufacturing costs and the assembly time thereof, and that is convenient to operate.

Yet another object of this invention is to provide an infant supporting apparatus having a caster device that includes a caster convertible between unfolded and folded positions such that, when the caster is at the folded position, the infant supporting apparatus is swingable.

According to an aspect of this invention, there is provided a caster device comprising:

a housing defining an accommodation space having an open bottom end;

a rotating member disposed within the housing and rotatable relative to the housing between first and second angular positions; and a caster connected to and co-rotatable with the rotating member;

wherein one of the housing and the rotating member has a first engaging portion and a second engaging portion that are spaced apart from each other by an angle corresponding to that formed between the first and second angular positions, and the other one of the housing and the rotating member has a third engaging portion, which engages the first engaging portion so that the caster is disposed at an unfolded position and outwardly of the housing when the rotating member is at the first angular position and which engages the second engaging portion so that the caster is disposed at a folded position and within the accommodation space when the rotating member is at the second angular position.

According to another aspect of this invention, there is provided an infant supporting apparatus comprising a frame and two caster devices disposed respectively at two opposite sides of a bottom end of the frame, each of the caster devices including:

a housing mounted to the bottom end of the frame and defining an accommodation space having an open bottom end;

a rotating member disposed within the housing and rotatable relative to the housing between first and second angular positions; and a caster connected to and co-rotatable with the rotating member;

wherein one of the housing and the rotating member has a first engaging portion and a second engaging portion that are spaced apart from each other by an angle corresponding to that formed between the first and second angular positions, and the other one of the housing and the rotating member has a third engaging portion, which engages the first engaging portion so that the caster is disposed at an unfolded position and outwardly of the housing when the rotating member is at the first angular position and which engages the second engaging portion so that the caster is disposed at a folded position and within the accommodation space when the rotating member is at the second angular position.

As such, the caster is convertible between the unfolded and folded positions. Furthermore, since the caster device is comprised of a small number of components, the manufacturing costs and the assembly time thereof can be reduced, and the caster device is convenient to operate.

BRIEF DESCRIPTION OF THE DRAWINGS

These and other features and advantages of this invention will become apparent in the following detailed description of the preferred embodiments of this invention, with reference to the accompanying drawings, in which:

FIG. 5 is a partly sectional, partly exploded perspective view of the caster device of the first preferred embodiment;

FIG. 6 is a schematic sectional view of the caster device of the first preferred embodiment, illustrating a second through hole in a rotating member and a positioning hole in a rotary knob;

FIG. 7 is a partly sectional, assembled perspective view of the caster device of the first preferred embodiment, illustrating the rotating member at a first angular position, and the caster at an unfolded position;

FIG. 8 is a partly sectional, assembled perspective view the caster device of the first preferred embodiment, illustrating that a first engaging portion is pressed to separate from a third engaging portion;

FIG. 11 is a partly sectional, assembled perspective view of the caster device of the first preferred embodiment, illustrating that a second engaging portion is pressed to separate from the third engaging portion;

FIG. 12 is a partly sectional, partly exploded perspective view of the caster device of a second preferred embodiment of an infant supporting apparatus according to this invention;

FIG. 13 is a perspective view of a rotating member of the second preferred embodiment, illustrating that first and second engaging portions are disposed respectively within two slide slots in the rotating member;

FIG. 14 is a partly sectional side view of the caster device of the second preferred embodiment, illustrating the rotating member at a first angular position, and a caster at an unfolded position;

FIG. 15 is a partly sectional, assembled perspective view of the caster device of the second preferred embodiment, illustrating that a first engaging portion is pressed to separate from a third engaging portion;

FIG. 16 is a partly sectional, assembled perspective view of the caster device of the second preferred embodiment, illustrating the rotating member at a second angular position, and the caster at a folded position;

FIG. 17 is a partly sectional, assembled perspective view of the caster device of the second preferred embodiment, illustrating that a second engaging portion is pressed to separate from the third engaging portion;

FIG. 23 is a fragmentary schematic sectional view of the caster device of the third preferred embodiment, illustrating how the third engaging portion is engaged within a second engaging portion;

FIG. 24 is a fragmentary schematic sectional view of the caster device of the third preferred embodiment, illustrating the rotating member at a second angular position, and the caster at a folded position; and FIG. 25 is a fragmentary schematic sectional view of the caster device of the third preferred embodiment, illustrating how a motive-force end of a pushbutton is pressed to remove the third engaging portion from the second engaging portion.

DETAILED DESCRIPTION OF THE PREFERRED EMBODIMENTS

Figure 1:
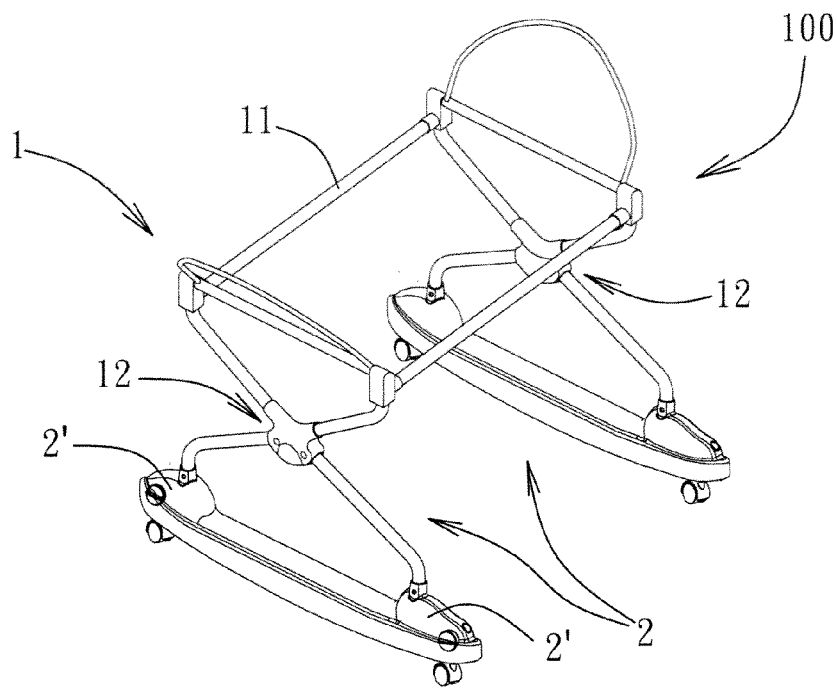
FIG. 1 is a perspective view of the first preferred embodiment of infant supporting apparatus according to this invention.

Before the present invention is described in greater detail in connection with the preferred embodiments, it should be noted that similar elements and structures are designated by like reference numerals throughout the entire disclosure.

Figure 2:
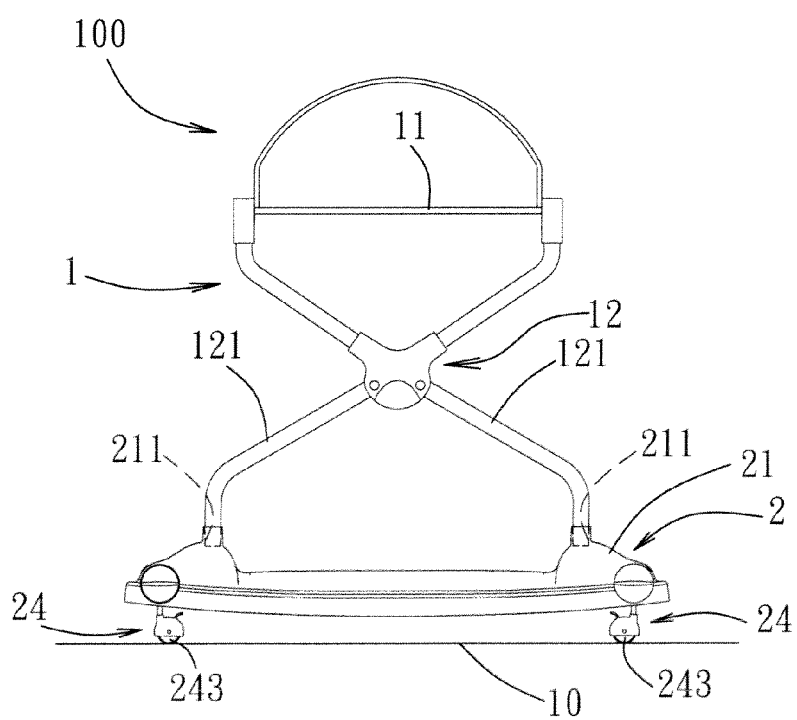
FIG. 2 is a side view of the first preferred embodiment, illustrating that each caster is disposed at an unfolded position.

Referring to FIGS. 1 and 2, the first preferred embodiment of an infant supporting apparatus 100 according to this invention is configured as an infant rocking bed, and includes a frame unit 1 and two caster sets 2 disposed respectively at two opposite sides of a bottom end of the frame 1. The frame unit 1 includes a rectangular main frame 11 for supporting a mattress (not shown), and two support frames 12 disposed respectively at two opposite sides of the main frame 11. The caster sets 2 are disposed respectively on bottom ends of the support frames 12, and cooperate with the support frames 12 to support the main frame 11. Each of the caster sets 2 consists of two caster devices 2'. Although the infant supporting apparatus 100 is exemplified using the infant rocking bed in this embodiment, it may be a high chair or a play yard. Since the caster devices 2' are similar in construction to each other, only one of the caster devices 2' will be described in the succeeding paragraphs.

Figure 3:
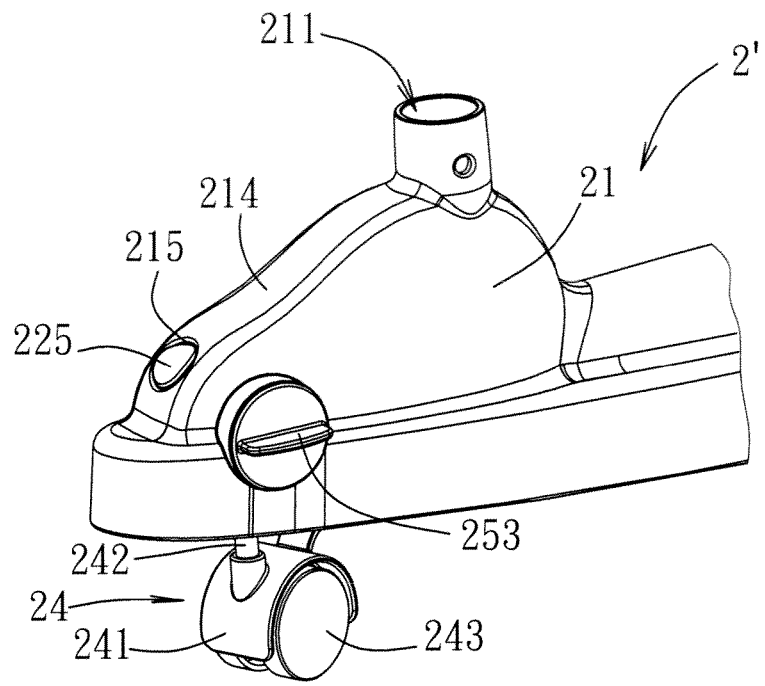
FIG. 3 is a perspective view of a caster device of the first preferred embodiment.
Figure 4:
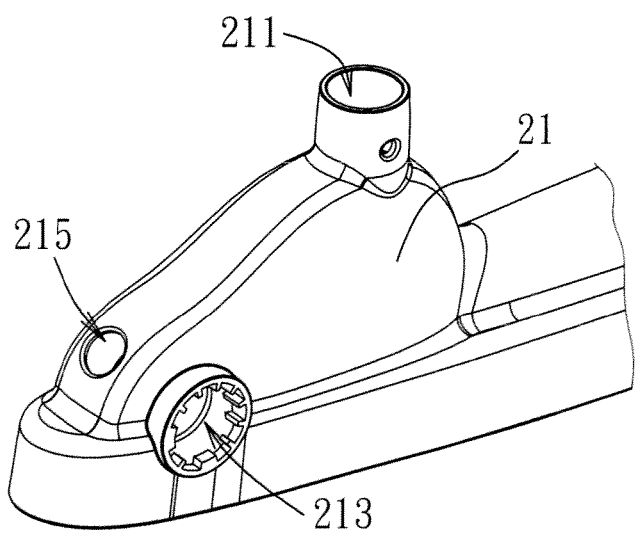
FIG. 4 is a perspective view of a housing of the caster device of the first preferred embodiment.

With additional reference to FIGS. 3, 4, and 5, the caster device 2' includes a housing 21, a rotating member 22, and a caster 24. The housing 21 has an insert groove 211 formed in a top end portion thereof and permitting a tube 121 of the corresponding support frame 12 to be inserted thereinto. The housing 21 defines an accommodation space 212 having an open bottom end. The housing 21 further has two through holes 213 formed respectively through two opposite sidewalls 214 of the housing 21. The accommodation space 212 is used to receive the rotating member 22 and the caster 24. The rotating member 22 includes a rotating portion 22' and a rotary knob 25. The rotating portion 22' includes a peripheral wall 220, a horizontal first through hole 221 defined by the peripheral wall 220, a vertical second through hole 222 having an open end formed in the peripheral wall 220 and in spatial communication with the first through hole 221, and an upright plate portion 223 extending upwardly from a top end of the peripheral wall 220. The first through hole 221 in the rotating portion 22' is aligned with the through holes 213 in the housing 21, so as to allow the rotary knob 25 of the caster device 2' to extend through the through holes 213 in the housing 21 and the through hole 221 in the rotating portion 22'. As such, the rotating portion 22' is connected pivotally to the housing 21 by the rotary knob 25 to allow rotation of the rotating member 22 relative to the housing 21.

With further reference to FIGS. 6 and 7, the caster 24 includes a caster housing 241, a vertical supporting member 242 disposed on a top end of the caster housing 241, and a wheel body 243 disposed pivotally on the caster housing 241. The rotary knob 25 includes a plug body 251, and an actuator portion 253 connected to an end of the plug body 251. The plug body 251 has a vertical positioning hole 252 aligned with the second through hole 222 in the rotating portion 22'. The supporting member 242 of the caster 24 extends through the second through hole 222 in the rotating portion 22' and into the positioning hole 252 in the plug body 251. As such, the caster 24 is connected to the rotating portion 22' of the rotating member 22 and the rotary knob 25. Preferably, in this embodiment, the rotating portion 22' of the rotating member 22 and the rotary knob 25 are made of plastic material, and the supporting member 242 is interference-fitted within the second through hole 222 and the positioning hole 252, so as event removal of the supporting member 242 from the second through hole 222.

The rotating portion 22' further includes two curved resilient plates 224 extending from a top end of the upright plate portion 223 away from each other, and first and second engaging portions 225, 226 disposed respectively at the resilient plates 224. Each of the resilient plates 224 has a free end 227 that is orientated somewhat downwardly. The first engaging portion 225 is configured as a first retaining block, and is formed integrally on a portion of the left resilient plate 224 adjacent to the free end 227. The second engaging portion 226 is configured as a second engaging block, and is formed integrally on a portion of the right resilient plate 224 adjacent to the free end 227. The first and second engaging portions 225, 226 are spaced apart from each other by an appropriate angle. In this embodiment, the appropriate angle is 90 degrees. The housing 21 has a third engaging portion 215 configured as an engaging hole formed therethrough, and a first stop portion 216. The engaging hole 215 is of a shape corresponding to that of each of the first and second engaging blocks 225, 226. As such, the third engaging portion 215 is engageable with a selected one of the first and second engaging portions 225, 226 to lock the rotating member 22 and the housing 21 relative to each other. Subsequently, the selected one of the first and second engaging portions 225, 226 can be pressed to separate from the third engaging portion 215 to thereby release the rotating member 22 and the housing 21 from each other.

In this embodiment, the two resilient plates 224 of the rotating member 22 are interconnected integrally. A reinforcing portion 228 is connected between the upright plate portion 223 and each of the resilient plates 224 to increase the strength of the resilient plates 224, thereby preventing breakage occurring at junctions between the upright plate portion 223 and the resilient plates 224.

The actuator portion 253 of the rotary knob 25 is configured as a rib, and is operable to rotate the rotary knob 25 and, thus, the rotating portion 22'. Hence, the rotating member 22 is rotatable relative to the housing 21 between a first angular position shown in FIG. 7 and a second angular position shown in FIG. 9. Rotation of the rotating portion 22' of the rotating member 22 is transferred to the caster 24. In this embodiment, the first and second engaging portions 225, 226 are spaced apart from each other by an angle corresponding to that formed between the first and second angular positions. The rotating member 22 further includes a second stop portion 229 that contacts the first stop portion 216 as the rotating member 22 is at the first angular position, such that the rotating member 22 is limited to rotate from the first angular position to the second angular portion in a single direction.

During assembly of the caster device 2', the rotating portion 22' of the rotating member 22 is first placed into the accommodation space 212, such that the first engaging portion 225 of the rotating portion 22' engages the third engaging portion 215 of the housing 21. Hence, the first through hole 221 in the rotating portion 22' is aligned with the through holes 213 in the housing 21. Next, the plug body 251 of the rotary knob 25 is passed through the through holes 213 in the housing 21 and the first through hole 221, the rotating portion 22' to allow for rotation of the rotating portion 22' relative to the housing 21. At this time, the actuator portion 253 of the rotary knob 25 is exposed outwardly of the housing 21, as shown in FIG. 3. Finally, the supporting member 242 of the caster 24 is inserted through the second through hole 222 in the rotating portion 22' and into the positioning hole 252 in the plug body 251, thereby completing the assembly of the caster device 2'. Since the caster device 2' is comprised of a small number of components, the manufacturing costs and the assembly time thereof can be reduced. Furthermore, when the first engaging portion 225 engages the third engaging portion 215, an outer surface of the first engaging portion 225 is aligned with an outer surface of the corresponding sidewall 214 surrounding the first engaging portion 225, thereby presenting a neat appearance of the housing 21.

With particular reference to FIGS. 2 and 7, when the rotating member 22 is disposed at the first angular position, the first engaging portion 225 engages the third engaging portion 215. At this time, rotation of the rotating member 22 relative to the housing 21 is prevented, and the caster 24 is disposed at an unfolded position whereat it is exposed outwardly of the accommodation space 212 and is in contact with the ground surface 10. In this position, the caster device 2' is slidable on the ground surface 10. When each caster 24 is at the unfolded position, the infant supporting apparatus 100 can be pushed to move on the ground surface 10.

Referring to FIG. 8, when it is desired to fold the caster 24, the first engaging portion 225 is pressed in a first direction (I) to separate it from the third engaging portion 215. Subsequently, the actuator portion 253 of the rotary knob 25 together with the rotating member 22 and the caster 24 are rotated in a second direction (II). During rotation of the rotating member 22 in the second direction (II), the second engaging portion 226 comes into contact with an inner wall surface of the housing 21. Hence, the second engaging portion 226 slides on the inner wall surface of the housing 21 such that the free end 27 of the right resilient plate 224 is pushed toward the upright plate portion 223 to thereby store a return force.

Figure 9:
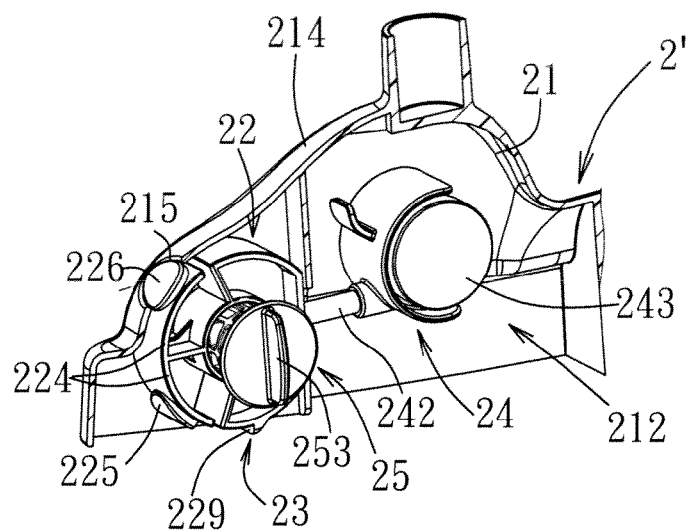
FIG. 9 is a partly sectional, assembled perspective view of the caster device of the first preferred embodiment, illustrating the rotating member at a second angular position, and the caster at a folded position.
Figure 10:
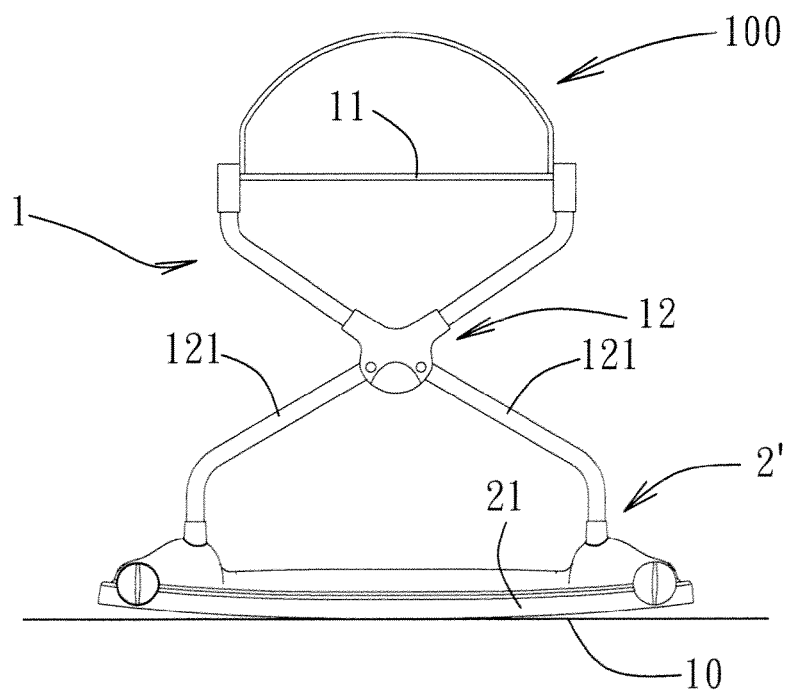
FIG. 10 is a side view of the first preferred embodiment, illustrating that each caster is disposed at a folded position.

When the rotating member 22 rotates to the second angular position, the second engaging portion 226 separates from the inner wall surface of the housing 21, and is biased to engage the third engaging portion 215 by the return force of the right resilient plate 224, thereby maintaining the rotating member 22 at the second angular position. At this time, the caster 24 is disposed at a folded position, as shown in FIG. 9. With further reference to FIG. 10, when each caster 24 is at the folded position, the housing 21 is in contact with the ground surface 10. As such, the infant supporting apparatus 100 can be pushed to swing above or rock on the ground surface 10.

Subsequently, when it is desired to unfold the caster 24, as shown in FIG. 11, the second engaging portion 226 is pressed to separate from the third engaging portion 215. Afterwards, the actuator portion 253 of the rotary knob 25 together with the rotating member 22 and the caster 24 are rotated in a third direction (III) opposite to the second direction (II). When the rotating member 22 is rotated to the first angular position, the first engaging portion 225 is biased to engage the third engaging portion 215 to maintain the rotating member 22 at the first angular position.

FIGS. 12, 13, and 14 show the caster device (2A) of the second preferred embodiment of an infant supporting apparatus according to this invention, which is similar in construction to that of the first preferred embodiment except for the rotating member (22A), the first engaging portion 26, and the second engaging portion 27.

The rotating portion 22' of the rotating member 22A includes two spaced-apart cylindrical surrounding walls connected fixedly to the peripheral wall 220. Each of the surrounding walls 230 defines a radially extending slide slot 232 having an open end 231, and two guide slots 233 in spatial communication with the slide slot 232. The first engaging portion 26 is inserted into the corresponding slide slot 232 via the open end 231, and includes a pressing block 260 and two resilient arms 261 extending downwardly from the pressing block 260. Each of the resilient arms 261 is formed with a projection 262 at a bottom end portion of an outer side surface thereof. The projections 262 of the resilient arms 261 are movable respectively within the corresponding guide slots 233. Since each of the guide slots 233 has two opposite closed ends, the maximum travel of the first engaging portion 26 in the corresponding slide slot 232 is limited. Each of the second engaging portions 27 is similar in construction to the first engaging portions 26, and includes a pressing block 270 and two resilient arms 271 each formed with a projection 272. The projections 272 of the resilient arms 271 are movable respectively within the corresponding guide slots 233. As such, the maximum travel of each of the second engaging portions 27 in the corresponding slide slot 232 is also limited. The first and second engaging portions 26, 27 are spaced apart from each other by an appropriate angle. In this embodiment, the appropriate angle is 90 degrees.

In an alternative embodiment, each of the surrounding walls 230 includes a single guide slot 233, and each of the first and second engaging portions 26, 27 includes a single resilient arm 261, 271, and a single projection 262, 272 formed on the resilient arm 261, 271.

The caster device (2A) further includes two coiled compression springs 28 disposed respectively in the slide slots 232. Each of the springs 28 has two opposite ends abutting respectively against the peripheral wall 220 and the corresponding pressing block 260, 270 so as to bias the corresponding pressing block 260, 270 to project from the open end 231 of the corresponding slide slot 232, thereby allowing for engagement of a corresponding one of the first and second engaging portions 26, 27 with the third engaging portion 215.

With particular reference to FIG. 14, when the rotating member (22A) is disposed at the first angular position, the pressing block 260 of the first engaging portion 26 is biased by the corresponding spring 28 to project from the open end 231 of the corresponding slide slot 232 to engage the third engaging portion 215, so as to maintain the caster 24 at the unfolded position.

Referring to FIGS. 15 and 16, when it is desired to fold the caster 24, the pressing block 260 of the first engaging portion 26 is first pressed in the first direction (I) to separate from the third engaging portion 215 to thereby compress the corresponding spring 28. Next, the actuator portion 253 of the rotary knob 25 together with the rotating portion 22' and the caster 14 are rotated in the second direction (II). During rotation of the rotating portion 22' in the second direction (II), the pressing block 270 of the second engaging portion 27 is pushed and retracted into the corresponding slide slot 232 by the housing 21 to compress the corresponding spring 28. When the rotating member (22A) is rotated to the second angular position, the pressing block 270 of the second engaging portion 27 is biased by the corresponding spring 28 to project from the open end 231 of the corresponding slide slot 232 to engage the third engaging portion 215, thereby maintaining the caster 24 at the folded position, as shown in FIG. 16.

Referring to FIG. 17, when it is desired to unfold the caster 24, the pressing block 270 of the second engaging portion 27 is first pressed to separate from the third engaging portion 215 to thereby compress the corresponding spring 28. Next, the actuator portion 253 of the rotary knob 25 together with the rotating portion 22' and the caster 24 are rotated in a third direction (III). When the rotating member (22A) is rotated to the first angular position, the first engaging portion 26 is biased to engage the third engaging portion 215, thereby returning the caster 24 to the unfolded position (see FIG. 14).

Figure 18:
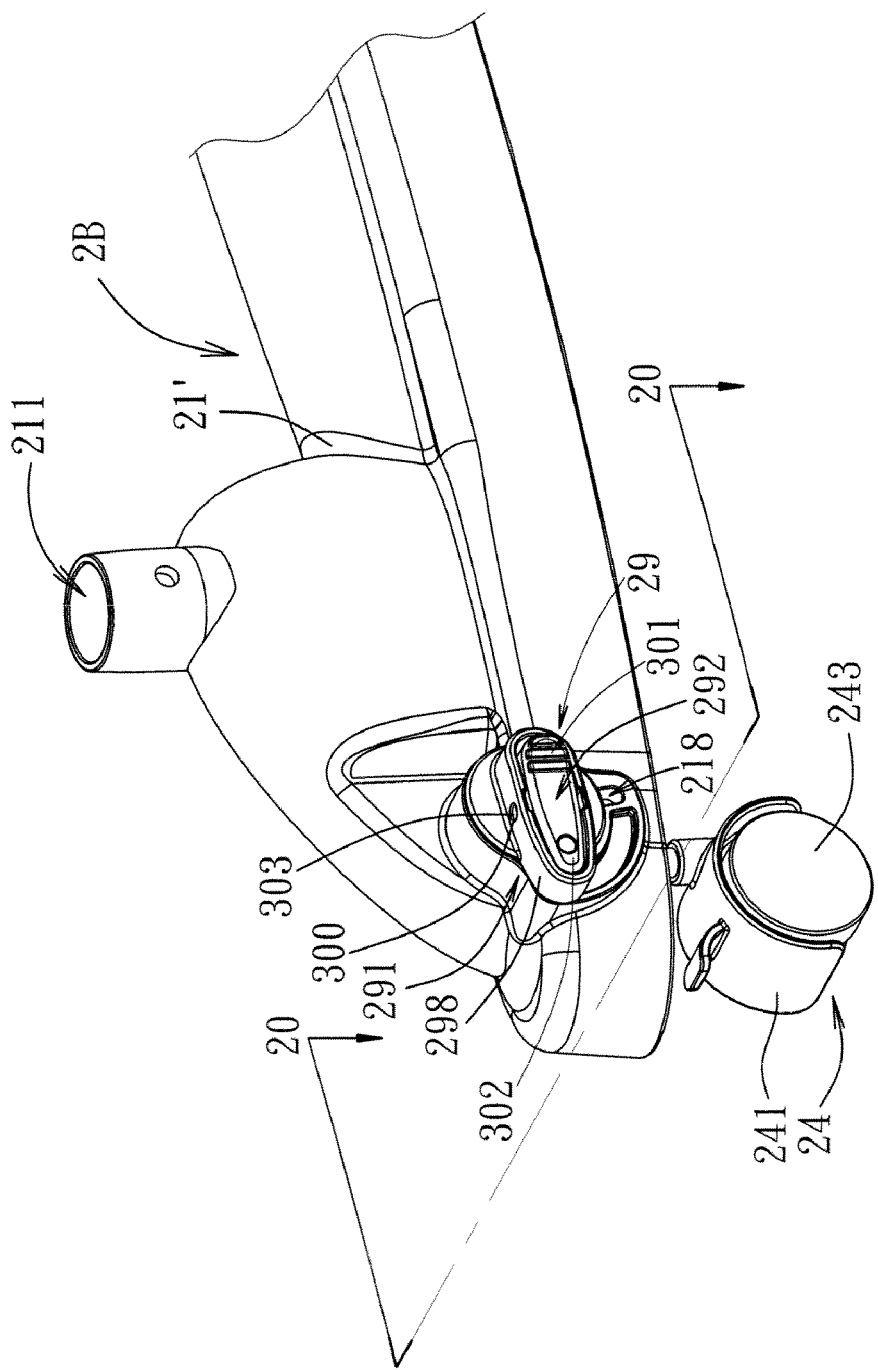
FIG. 18 is an assembled perspective view of the caster device of a third preferred embodiment of an infant supporting apparatus according to this invention.
Figure 19:
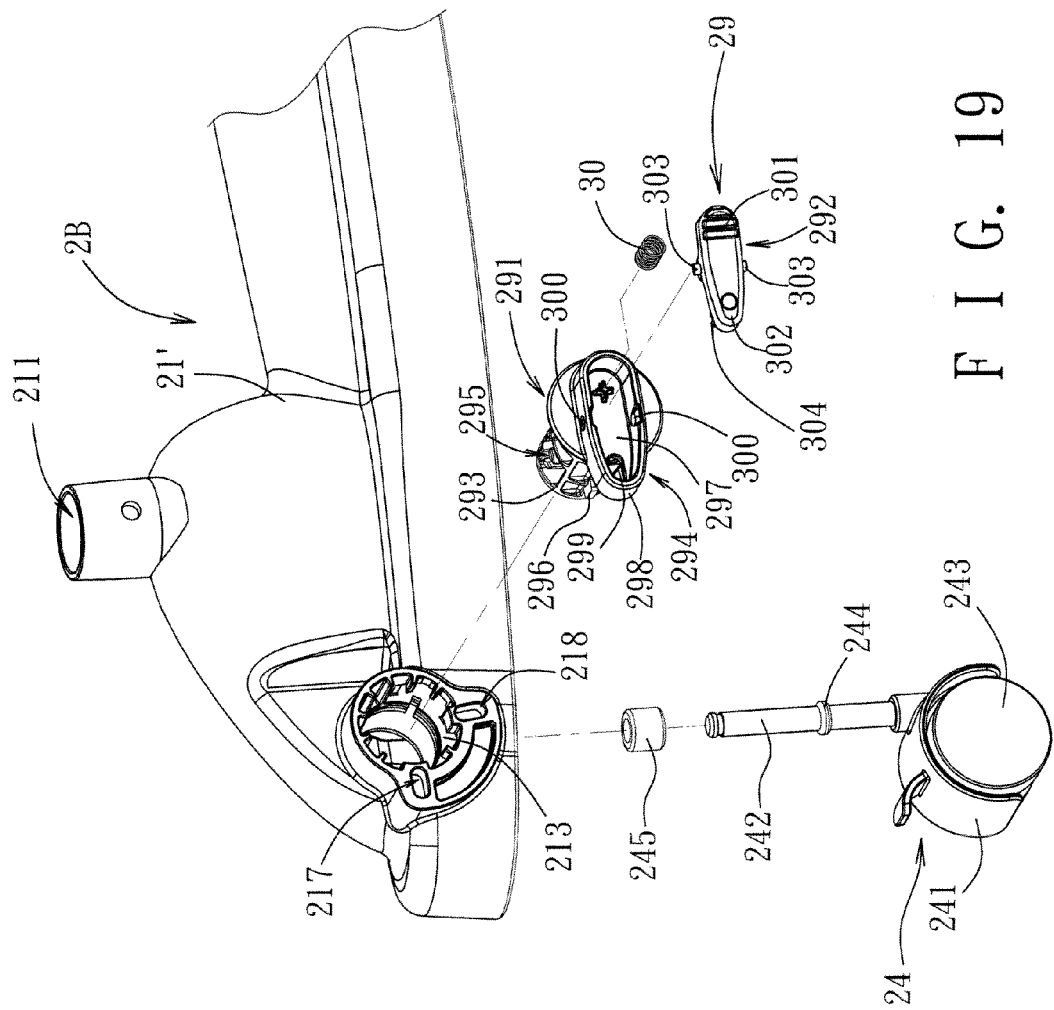
FIG. 19 is a partly exploded perspective view of the caster device of the third preferred embodiment.
Figure 20:
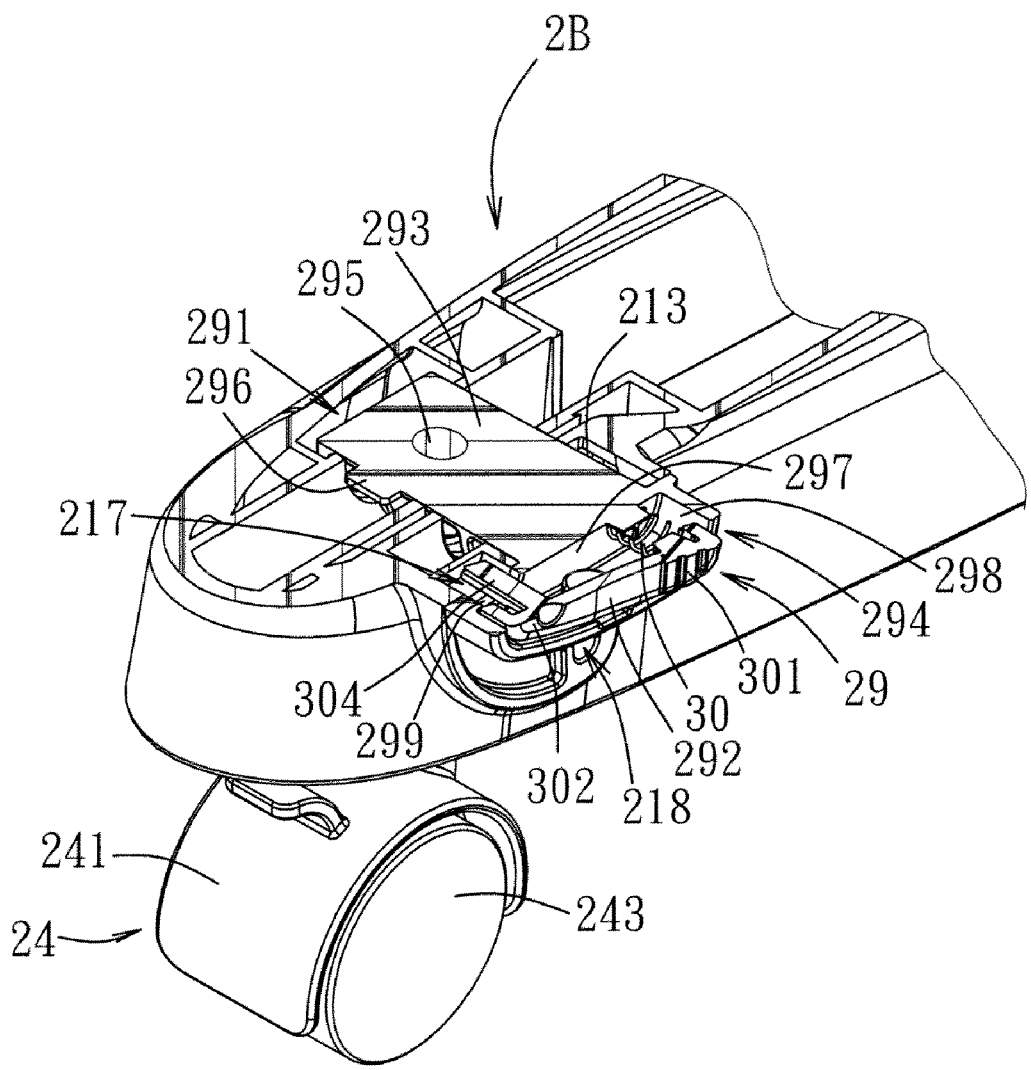
FIG. 20 is a sectional view taken along Line 20-20 in FIG. 18.

FIGS. 18, 19, and 20 show the caster device (2B) of the third preferred embodiment of an infant supporting apparatus according to this invention, which is similar in construction to that of the first preferred embodiment except for the housing 21' and the rotating member 29.

The housing 21' has a first engaging portion 217 and a second engaging portion 218. The first engaging portion 217 is configured as a first positioning groove. The second engaging portion 218 is configured as a second positioning groove spaced apart from the first positioning groove 217 by an appropriate angle. In this embodiment, the appropriate angle is 90 degrees. The rotating member 29 includes a rotary knob 291 and a pushbutton 292. The rotary knob 291 includes a plug body 293 disposed within the through holes 213 in the housing 21', and an actuator portion 294 connected to an end of the plug body 293. The plug body 293 includes a vertical positioning hole 295 permitting the supporting member 242 of the caster 24 to extend thereinto, and a positioning rib 296 that contacts the first stop portion 216 of the housing 21' as the rotating member 29 is at the first angular position. In this embodiment, the supporting member 242 is interference-fitted within the through hole 295 in the plug 293. Preferably, the supporting member 242 is formed with an annular flange 244 radially and outwardly from an intermediate portion thereof, and is provided with a washer 245 sleeved on the supporting member 242 and abutting against a top end of the flange 244 and the plug body 293 to prevent sway of the supporting member 242. Alternatively, the flange 244 and the washer 245 may be omitted from the supporting member 242.

The actuator portion 294 includes a connecting plate 297 and a surrounding wall 298 extending from the connecting plate 297. The pushbutton 292 is connected pivotally to the surrounding wall 298. The connecting plate 297 is formed with a through hole 299 having a shape corresponding that of each of the first and second engaging portion 217, 218. The surrounding wall 298 is formed with aligned pivot holes 300. The pushbutton 292 has a motive-force end 301 allowing for manual operation, and a resistive-force end 302 opposite to the motive-force end 301, and two aligned pivot pins 303 disposed between the motive-force end 301 and the resistive-force end 302. The pivot pins 303 engage respectively the pivot holes 300 in the surrounding wall 298 of the actuator portion 294 to connect the pushbutton 292 pivotally to the surrounding wall 298. The resistive-force end 302 of the pushbutton 298 is formed integrally with a third engaging portion 304 projecting therefrom. The third engaging portion 304 is configured as an engaging block extending through the through hole 299 in the actuator portion 294. The caster device (2B) further includes a coiled compression spring 30 disposed between the connecting plate 297 of the actuator portion 294 and the motive-force end 301 and having two ends abutting respectively against the connecting plate 297 and the motive-force end 301. The spring 30 provides a force for biasing the third engaging portion 304 to project from the through hole 299 so as to engage the first engaging portion 217 or the second engaging portion 218.

Figure 21:
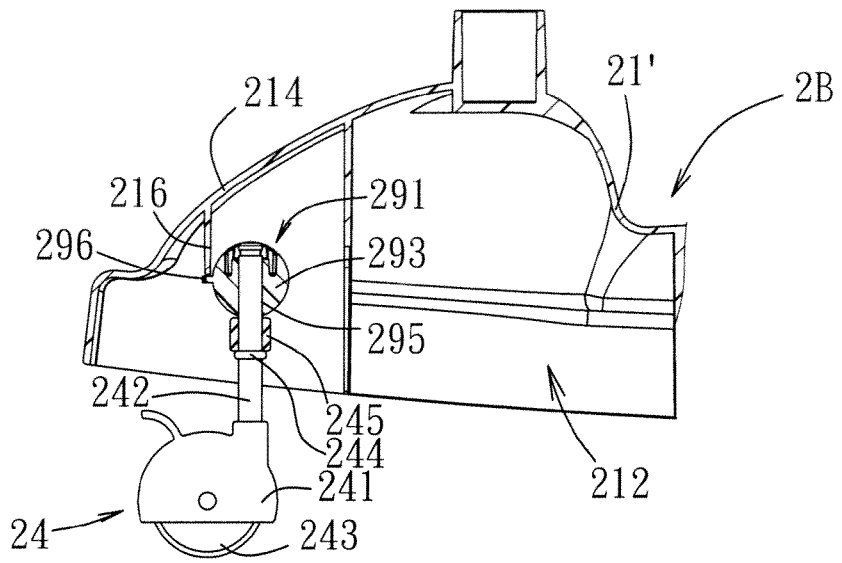
FIG. 21 is a schematic sectional view of the caster device of third preferred embodiment, illustrating a rotating member at a first angular position, and a caster at an unfolded position.

Referring to FIGS. 20 and 21, when the rotating member 29 is disposed at the first angular position, the through hole 299 in the rotary knob 291 is aligned with the first engaging portion 217. At this time, due to the biasing force of the spring 30 applied to the motive-force end 301, the third engaging portion 304 of the rotary knob 292 projects from the through hole 299 to engage the first engaging portion 217. Hence, the rotary knob 291 and the pushbutton 292 of the rotating member 29 cannot rotate relative to the housing 21', thereby maintaining the caster 24 at the unfolded position.

Figure 22:
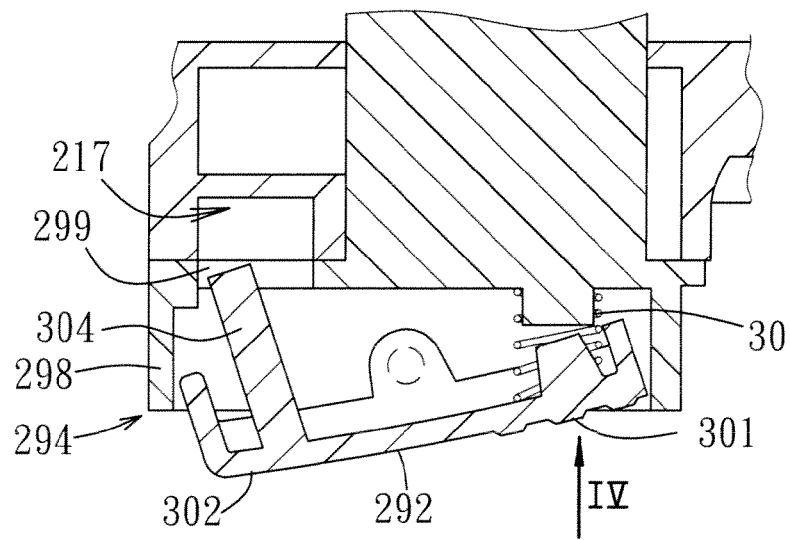
FIG. 22 is a fragmentary schematic sectional view of the caster device of the third preferred embodiment, illustrating that a motive-force end of a pushbutton is pressed to remove a third engaging portion from a first engaging portion.

Referring to FIGS. 22, 23, and 24, when it is desired to fold the caster 24, a pressing force is applied to the motive-force end 301 of the pushbutton 292 in a fourth direction (IV) to rotate the pushbutton 292 about the pivot pins 303 (see FIG. 19) to thereby compress the spring 30. Hence, the resistive-force end 302 moves in a direction opposite to the fourth direction (IV) to thereby remove the third engaging portion 304 from the first engaging portion 217. Subsequent to separation of the first and third engaging portions 217, 304, the actuator portion 294 of the rotary knob 291 together with the caster 24 are rotated in the second direction (II). When the rotating member 29 rotates to the second angular position, the through hole 299 in the rotary knob 291 is aligned with the second engaging portion 218. At this time, the pressing force is released to allow the motive-force end 301 to pivot outwardly to thereby rotate the pushbutton 292 relative to the surrounding wall 298, so that the third engaging portion 304 projects from the through hole 299 to engage the second engaging portion 218, thereby maintaining the caster 24 at the folded position (see FIG. 24).

Referring to FIGS. 24 and 25, when it is desired to unfold the caster 24, the motive-force end 301 of the pushbutton 292 is pressed in the fourth direction (IV) to remove the third engaging portion 304 from the second engaging portion 218. Subsequent to separation of the second and third engaging portions 218, 304, the actuator portion 294 together with the caster 24 are rotated in the third direction (III). When the rotating member 29 is rotated to the first angular position, the third engaging portion 304 is biased to engage the first engaging portion 217, thereby returning the caster 24 to the unfolded position (see FIG. 20).

In view of the above, in the caster device (2, 2A, 2B) of each of the first, second, and third embodiments, when the rotating member 22, 29 is disposed at the first angular position, the first engaging portion 225, 26, 217 engages the third engaging portion 215, 304 to maintain the caster 24 at the unfolded position; and when the rotating member 22, 29 is disposed at the second angular position, the second engaging portion 226, 27, 218 engages the third engaging portion 215, 304 to maintain the caster 24 at the folded position. As such, the caster 24 is convertible between the unfolded and folded positions. Furthermore, since the caster device (2, 2A, 2B) is comprised of a small number of components, and is simple in structure, the manufacturing costs and assembly time thereof can be reduced. Further, the caster device (2, 2A, 2B) is convenient to operate. Thus, the objects of this invention are achieved.

With this invention thus explained, it is apparent that numerous modifications and variations can be made without departing from the scope and spirit of this invention. It is therefore intended that this invention be limited only as indicated by the appended claims.

We claim:

1. A caster device comprising:
a housing defining an accommodation space having an open bottom end;
a rotating member disposed within said housing and rotatable relative to said housing between first and second angular positions; and
a caster connected to and co-rotatable with said rotating member;
wherein one of said housing and said rotating member has a first engaging portion and a second engaging portion that are spaced apart from each other by an angle corresponding to that formed between said first and second angular positions, and the other one of said housing and said rotating member has an integrally formed third engaging portion, which engages said first engaging portion so that said caster is disposed at an unfolded position and outwardly of said housing when said rotating member is at said first angular position and which engages said second engaging portion so that said caster is disposed at a folded position and within said accommodation space when said rotating member is at said second angular position.

2. The caster device as claimed in claim 1, wherein said rotating member includes a rotating portion having said first and second engaging portions, said first and second engaging portions being disposed resiliently on said rotating portion, said third engaging portion being disposed at said housing.

3. The caster device as claimed in claim 2, wherein said rotating portion includes two resilient plates each having a free end, said first and second engaging portions being configured respectively as two engaging blocks that are disposed respectively on said resilient plates, said third engaging portion being configured as a retaining hole engageable with a selected one of said first and second engaging blocks.

4. The caster device as claimed in claim 2, wherein said rotating portion is formed with two slide slots, said first and second engaging portions being respectively and slidably mounted at said slide slots, said third engaging portion being configured as an engaging hole.

5. The caster device as claimed in claim 4, further comprising two springs disposed respectively in said slide slots for providing a return force to said first and second engaging portions.

6. The caster device as claimed in claim 2, wherein said rotating member further includes a rotary knob extending through said rotating portion and connected rotatably to said housing, said rotary knob including an actuator portion disposed outwardly of said housing and operable for driving rotation of said rotating portion relative to said housing.

7. The caster device as claimed in claim 1, wherein said rotating member includes a rotary knob connected rotatably to said housing and connected to said caster, said rotary knob including an actuator portion disposed outwardly of said housing and operable for driving rotation of said rotating member relative to said housing.

8. The caster device as claimed in claim 7, wherein said rotating member further includes a pushbutton connected pivotally to said actuator portion, said third engaging portion being disposed at said pushbutton, said first and second engaging portions being disposed at said housing.

9. The caster device as claimed in claim 8, wherein said first and second engaging portions are configured respectively as first and second positioning grooves, said pushbutton having a motive-force end and a resistive-force end that are opposite to each other, said third engaging portion being configured as an engaging block formed integrally on said resistive-force end.

10. The caster device as claimed in claim 9, further comprising a spring disposed between said motive-force end and said rotary knob for providing a return force to said pushbutton.

11. The caster device as claimed in claim 1, wherein said housing includes a first stop portion, said rotating member having a second stop portion, said second stop portion abutting against said first stop portion as said rotating member is at first angular position such that said rotating member is limited to rotate from said first angular position to said second angular portion in a single direction.

12. An infant supporting apparatus comprising a frame and a plurality of caster devices disposed at a bottom end of said frame, each of said caster devices including:
a housing mounted to said bottom end of said frame and defining an accommodation space having an open bottom end;
a rotating member disposed within said housing and rotatable relative to said housing between first and second angular positions; and
a caster connected to and co-rotatable with said rotating member;

wherein one of said housing and said rotating member has a first engaging portion and a second engaging portion that are spaced apart from each other by an angle corresponding to that formed between said first and second angular positions, and the other one of said housing and said rotating member has an integrally formed third engaging portion, which engages said first engaging portion so that said caster is disposed at an unfolded position and outwardly of said housing when said rotating member is at said first angular position and which engages said second engaging portion so that said caster is disposed at a folded position and within said accommodation space when said rotating member is at said second angular position.

13. The infant supporting apparatus as claimed in claim 12, wherein said rotating member includes a rotating portion having said first and second engaging portions, said first and second engaging portions being disposed resiliently on said rotating portion, said third engaging portion being disposed at said housing.

14. The infant supporting apparatus as claimed in claim 13, wherein said rotating portion includes two resilient plates each having a free end, said first and second engaging portions being configured respectively as two engaging blocks that are disposed respectively on said resilient plates, said third engaging portion being configured as a retaining hole engageable with a selected one of said first and second engaging blocks.

15. The infant supporting apparatus as claimed in claim 13, wherein said rotating portion is formed with two slide slots, said first and second engaging portions being respectively and slidably mounted at said slide slots, said third engaging portion being configured as an engaging hole.

16. The infant supporting apparatus as claimed in claim 15, further comprising two springs disposed respectively in said slide slots for providing a return force to said first and second engaging portions.

17. The infant supporting apparatus as claimed in claim 13, wherein said rotating member further includes a rotary knob extending through said rotating portion and connected rotatably to said housing, said rotary knob including an actuator portion disposed outwardly of said housing and operable for driving rotation of said rotating portion relative to said housing.

18. The infant supporting apparatus as claimed in claim 12, wherein said rotating member includes a rotary knob connected rotatably to said housing and connected to said caster, said rotary knob including an actuator portion disposed outwardly of said housing and operable for driving rotation of said rotating member relative to said housing.

19. The infant supporting apparatus as claimed in claim 18, wherein said rotating member further includes a pushbutton connected pivotally to said actuator portion, said third engaging portion being disposed at said pushbutton, said first and second engaging portions being disposed at said housing.

20. The infant supporting apparatus as claimed in claim 19, wherein said first and second engaging portions are configured respectively as first and second positioning grooves, said pushbutton having a motive-force end and a resistive-force end that are opposite to each other, said third engaging portion being configured as an engaging block formed integrally on said resistive-force end.

21. The infant supporting apparatus as claimed in claim 20, further comprising a spring disposed between said motive-force end and said rotary knob for providing a return force to said pushbutton.

22. The infant supporting apparatus as claimed in claim 12, wherein said housing includes a first stop portion, said rotating member having a second stop portion, said second stop portion abutting against said first stop portion as said rotating member is at the first angular position such that said rotating member is limited to rotate from said first angular position to said second angular portion in a single direction.

* * * * *